No. 805,010. PATENTED NOV. 21, 1905.
J. P. FULLILOVE.
FERTILIZER DISTRIBUTER.
APPLICATION FILED MAY 10, 1905.

UNITED STATES PATENT OFFICE.

JACK POPE FULLILOVE, OF SHREVEPORT, LOUISIANA.

FERTILIZER-DISTRIBUTER.

No. 805,010.  Specification of Letters Patent.  Patented Nov. 21, 1905.

Application filed May 10, 1905. Serial No. 259,713.

*To all whom it may concern:*

Be it known that I, JACK POPE FULLILOVE, a citizen of the United States, residing at Shreveport, in the parish of Caddo and State of Louisiana, have invented new and useful Improvements in Fertilizer-Distributers, of which the following is a specification.

My invention relates to fertilizer-distributing machines; and its objects are to provide means to enable a fertilizer receptacle and distributer to be readily attached to a wagon of ordinary construction and operated by the wheels thereof without the necessity of providing a special machine with special driving-gear for accomplishing this purpose and generally to improve and simplify a device of this kind.

To these ends my invention is embodied in preferable form in the machine herein described, and illustrated in the accompanying drawings.

Figure 1:
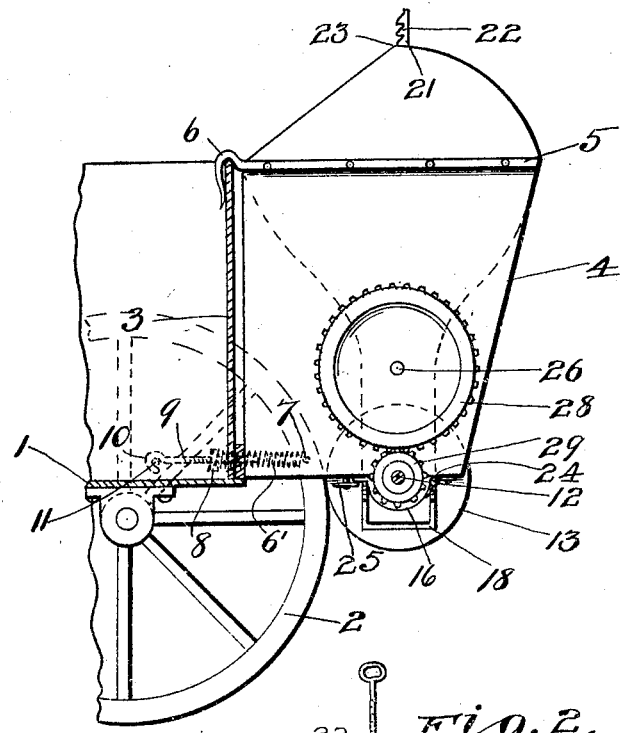
Figure 2:
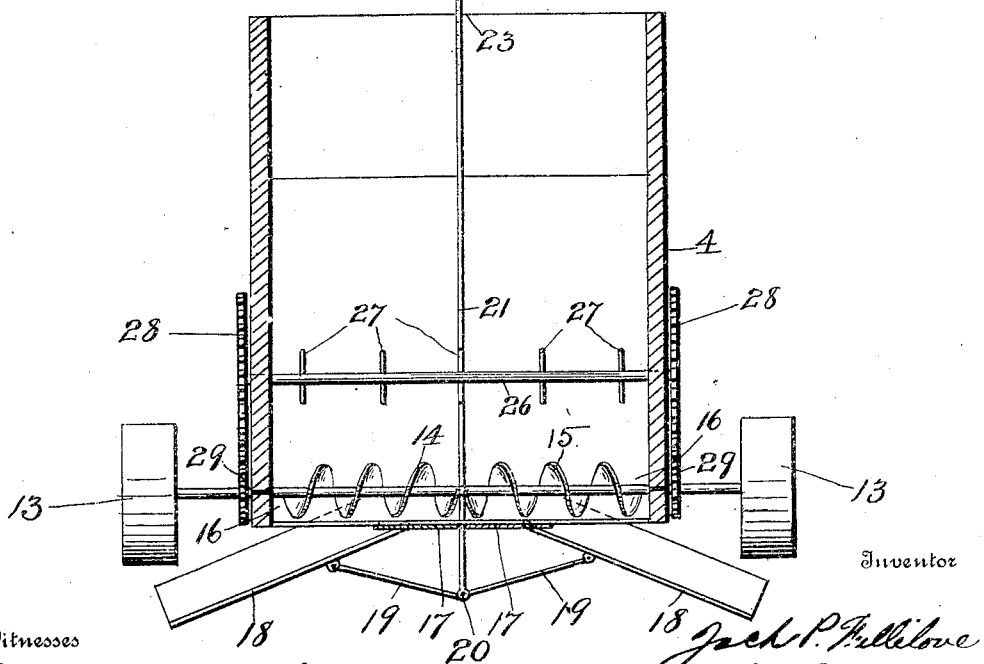

In the drawings, Figure 1 is a side view, partly in vertical section, of the rear part of a wagon, showing my attachment applied thereto; and Fig. 2 is a vertical section through the attachment looking toward the rear.

Referring to the drawings, 1 is the body of the wagon, and 2 one of the rear wheels thereof. The wagon has the usual rear end-gate 3. Adapted to be removably attached to this gate and the body of the wagon is a fertilizer box or receptacle 4, extending across the end of the wagon and provided on each side with a horizontal bar 5, securely bolted to the box and terminating in a hook 6. These hooks 6 form upper attaching members of the box and are adapted to hook over the top of the gate 3. At the lower end of the box, on each side, a coiled spring 6' is fastened to the box by the pin 7 at one end, and its other end engages a nut 8, screwed on the threaded end portion of a rod 9, which terminates in a hook 10. The hook 10 is adapted to be placed in engagement with the cross-bar 11 of the wagon-body.

Mounted on the lower part of the box, on a shaft 12, journaled in the box, are main driving-pulleys 13, which serve to operate the stirring and distributing mechanism and which are adapted to be driven by frictional contact with the wheels 2 of the wagon. The springs 6', threaded rods 9, and nuts 8 constitute an adjustable tension connection between the box and wagon, whereby the pulleys 13 may be held tightly against the tires of the wheels 2 to insure the necessary driving contact.

The shaft 12 is provided with a screw conveyer consisting of the two reversely-inclined spiral flanges 14 15, which are adapted to distribute the manure or other fertilizing material from each side of the box.

The distributing-screw is mounted in a trough 16, located at the bottom of the box, and which trough is provided in its bottom with two sliding doors 17, one on each side of the center of the conveyer. These doors serve to regulate the extent of openings in the trough, and consequently the amount of material discharged therefrom. Leading from the trough 16, at each side thereof, are discharge-chutes 18, inclined to permit the fertilizing material to pass down the same and adapted to respectively extend above two adjacent rows of furrows of the field to be fertilized.

Each discharge-chute is pivotally secured to a rod or arm 19, and these rods are pivoted together and also at their junction 20 to a vertical lift-rod 21. The rod 21 is provided near its upper end with teeth 22 to be adjustably engaged with the upper part of the box at 23.

The trough 16 is preferably hinged at 24 and latched at its opposite side at 25 in order to permit the trough to be swung down and cleaned, if desired.

Mounted in the box above the screw conveyer is a rotatable shaft 26, provided with stirring-fingers 27. In the ends of this shaft, outside the box, are secured cog-wheels 28, which mesh with and are driven by pinions 29 on the main driving-shaft 12.

The operation of the machine is as follows: The wagon being supplied with the fertilizing material, the box 4 is attached to the wagon by the hooks 6 and 10, and the nuts 8 of the lower hooks are so adjusted as to cause the springs 6' to pull the pulleys 13 tightly against the wheels 2 of the wagon. As the wagon is drawn along the fertilizing material is fed into the box through its open front end by spades or shovels, and the pulleys 13, driven by the wheels, will rotate the screw conveyer and also the stirring-shaft. The conveyer will feed the fertilizer out of the trough to each discharge-chute 18, from whence it will fall into the two adjacent rows. The rods 19 and 21 constitute a toggle-arm arrangement whereby the inner ends of the chutes 18 may be raised or lowered to spread the chutes apart or tilt them inward in order to accommodate the machine to differently-spaced rows.

It is clear that various changes in the details of the device may be made without departing from the principle of my invention.

Having thus described my invention, what I claim is—

1. In a fertilizer-distributer, in combination with a wagon and its wheels, a detachable fertilizer-receptacle, distributing mechanism, pulleys for driving said mechanism, said pulleys being mounted on said receptacle adapted to engage said wheels, a connecting-spring between said receptacle and wagon and means to adjust the tension of said spring, substantially as described.

2. In a fertilizer-distributer, in combination with a wagon, a detachable receiving and distributing box, supporting means for said box which consist solely of hooks at the upper part of the box and hooks at the lower part of the box which loosely engage said wagon, whereby the box may be readily attached to and lifted from the wagon, substantially as described.

3. In a fertilizer-distributer, in combination with a wagon and its wheels, a detachable receptacle, a distributing mechanism in said receptacle, a stirring mechanism therein, and pulleys adapted to drive said mechanism, said pulleys mounted on said receptacle and adapted to engage the wagon-wheels when the receptacle is attached thereto, substantially as described.

4. In a fertilizer-distributer, a two-way feeding mechanism, opposite discharge-chutes and toggle-arms on which said chutes are mounted and by which they are adjusted, substantially as described.

5. In a fertilizer-distributer, in combination with a wagon and its wheels, a detachable fertilizer-receptacle, reversely-inclined endless conveying-screws in said receptacle, a rotary stirring mechanism therein, a shaft for said conveying-screws and gearing between said shaft and the stirring mechanism, hooks on said receptacle adapted to loosely engage said wagon, whereby the receptacle may be lifted from the wagon and readily placed thereon, pulleys carried by said shaft in position on said receptacle to frictionally bear against the peripheries of the wagon-wheels when the receptacle is hooked to the wagon, and spring means for holding said pulleys tightly against the wagon-wheels, substantially as described.

In testimony whereof I affix my signature in presence of two subscribing witnesses.

JACK POPE FULLILOVE.

Witnesses:
S. C. FULLILOVE,
E. P. MILLS.